United States Patent [19]

Stockel

[11] 4,129,094
[45] Dec. 12, 1978

[54] ANIMAL LITTER COMPOSITION

[75] Inventor: Richard F. Stockel, Bridgewater Township, Middlesex County, N.J.

[73] Assignee: American Chemical Consulting Corp., New Rochelle, N.Y.

[21] Appl. No.: 775,730

[22] Filed: Mar. 9, 1977

[51] Int. Cl.² .............................................. A01K 29/00
[52] U.S. Cl. ....................................................... 119/1
[58] Field of Search ........................................... 119/1

[56] References Cited

U.S. PATENT DOCUMENTS

| | | | |
|---|---|---|---|
| 3,029,783 | 4/1962 | Sawyer et al. | 119/1 |
| 3,735,734 | 5/1973 | Pierce et al. | 119/1 |
| 3,776,188 | 12/1973 | Komakine | 119/1 |

*Primary Examiner*—Louis G. Mancene
*Assistant Examiner*—Daniel J. Leach

[57] ABSTRACT

Fly ash, bottom ash and/or boiler slag are used as animal litters and particularly as cat litters. These materials exhibit remarkable absorbent and deodorizing capabilities and their low cost makes them a commercially more attractive substitute for Fuller's earth and other currently available cat litter compositions. These materials are also effective when used in admixture with Fuller's earth or other known cat litters.

11 Claims, No Drawings

ANIMAL LITTER COMPOSITION

BACKGROUND OF THE INVENTION

Field of Invention

This invention relates to animal litters generally, and to cat litters specifically, and it is particularly related to the use of fly ash, bottom ash and boiler slag for such purpose.

The Prior Art

A variety of animal litters for household pets have been available and marketed for many years. Perhaps the most common material which has been widely used as a cat litter over the years is Fuller's earth which is composed mostly of two minerals, i.e., attapulgite and calcium montmorillonite which make up approximately 90 percent of its weight. Fuller's earth, however, has limited absorbent capacity and generally poor deodorizing capability. It also has relatively low pore volume and hence cannot effectively absorb large organic type metabolic decomposition products. Therefore, most potential malodorous substances resulting from such metabolic decompositions are simply absorbed on its surface and subsequently eminated upon prolonged standing.

With increased numbers of household pets, the problems of disposition of animal excrements has become more acute in recent years, and numerous suggestions have been made in a variety of patents for using various animal litters. Thus, in U.S. Pat. No. 3,286,691 it has been proposed to use "dehydrated grasses" which include both botanical grasses and artificial grasses, as a cat litter, instead of Fuller's earth. Dehydrated grasses, particularly alfalfa, are reported to exhibit both absorbing and deodorizing capabilities and, therefore, they have been recommended as cat litters instead of Fuller's earth.

U.S. Pat. No. 3,425,397 discloses the use of alfalfa coupled with a light weight, highly absorbent material such as vermiculite and perlite as animal litter. The alfalfa contains chlorophyll which is an effective deodorant.

U.S. Pat. No. 3,789,797 discloses a cat litter made from a mixture of alfalfa, bentonite and a binder. Ground and screened alfalfa is mixed with benotonite and the resulting mixture is mixed with a binder, and thereafter pelletized. As in the composition described in U.S. Pat. No. 3,425,397, supra, the alfalfa contains chlorophyll for effective odor control.

While the cat litters and animal litters disclosed in the aforementioned patents are more effective absorbents and deodorants than Fuller's earth, their production is costly and their use therefore is economically prohibitive.

U.S. Pat. No. 3,877,920 describes a method of reclaiming organic waste materials such as animal manure, spent mushroom, compost, sewage plant solids, etc., which involves homonogeous mixing of the organic waste with a fly ash "binder" and the reclaimed wastes are then deodorized and used as fertilizers, as agents for reclaiming coal mine wastes and as support material for plants.

So far as it is known, there is no cat litter on the marketplace today which has both absorbent and deodorizing capabilities, and which is more economical than Fuller's earth.

It is therefore an object of this invention to provide an improved animal litter, and particularly a cat litter composition. It is another object of this invention to provide a cat litter composition which is both highly absorbent and an excellent deodorizer.

It is also an object of this invention to provide such improved cat litter compositions from inexpensive and readily available raw materials.

It is yet another object of this invention to provide a cat litter composition which is more economical to use than Fuller's earth or other available cat litter compositions.

The foregoing and other objects of this invention will be more clearly comprehended from the following detailed description of the invention.

SUMMARY OF THE INVENTION

Fly ash, bottom ash and boiler slag exhibit remarkable absorbent and deodorizing capabilities when used as cat litters. They can be used in their available form from by-products of the combustion of coal, or they may be processed into and used as pellets or spherical granules. Their unique properties as cat litters coupled with their low cost offer a commercially more attractive substitute for Fuller's earth and other available cat litters.

Mixtures of fly ash, bottom ash and/or boiler slag together with Fuller's earth or other known cat litters may also be used in accordance with the invention.

DETAILED DESCRIPTION OF THE INVENTION

It has now been unexpectedly discovered that fly ash, bottom ash and boiler slag exhibit unique absorbent and deodorizing capabilities when used as cat litters. This discovery is both unique and surprising particularly since these materials have long been abundantly available as by-products of the combustion of pulverized coal, mostly in furnaces of public utility systems. It has been estimated that in 1975 more than 24 billion pounds of fly ash and over 56 billion pounds of boiler slag and bottom ash were produced from the burning of the coal, and by-and-large, these materials constitute industrial wastes which must be adequately disposed. As industry in general changes from oil and gas to coal even more fly ash, bottom ash and boiler slag will be available. Their utilization as cat litter, therefore, not only elimates the serious waste disposal problem which is associated with their production, but rather affords the injection into the cat litter market of a highly effective absorbent and deodorizing composition which is not only more effective than the available cat litters, but is less expensive as well.

The nature, chemical composition and physical characteristics of fly ash, however, varies from one region to another. See, for example, the article by J. D. Watt and D. J. Thorne, entitled "Composition and Pozzolanic Properties of Fly Ashes From Some British Power Stations and Properties of Their Component Particles," J. Appl. Chem., 15, December, 1965, pp. 585–594, and L. John Minnick, "Fundamental Characteristics of Pulverized Coal Fly Ashes," Journal of ASTM Proceedings, Vol. 59, 1955, pp. 1155–1177. Typically, however, the ranges of composition of fly ash is as follows:

| Ingredients | Percentages by Weight |
| --- | --- |
| Silicone Dioxide | 34–51 |
| Alumina | 15–30 |
| Ferric Oxide | 12–22 |
| Calcium Oxide | 2–7 |
| Magnesium Oxide | 0.5–1 |
| Sodium & Potassium Oxides | 1.5–4 |

Also, fly ash is mostly available as relatively minute spherical particles of 1 to 100 microns and when used as cat litter in such form, it is dusty and difficult to package, and moreover, cats tend to drag such fly ash particles with their paws into the household. It is therefore preferable to use larger fly ash particles of from about ⅛ to about ¾ inch in size. Although such larger particles have less surface area than the naturally available fly ash particles (1–100 microns), they are nevertheless more effective absorbents and deodorizers than Fuller's earth and other available cat litters. They can be readily packaged and they are not likely to be dragged into the household in the cat's paws.

In order to form fly ash pellets, the naturally available fly ash is mixed with a small amount of water and/or a small amount of an aqueous binder to form a paste of suitable consistency which is extruded through a conventional extruder. The extrudate may vary in size, shape or configuration depending on the size and shape of the die, and may be chopped to the desired pellet size, i.e., from about ⅛ to about ¾ inch by conventional means.

Other methods of pelletizing fly ash, bottom ash and boiler slag include the use of a die press, rotating disk, a drum agglomerator, etc. as described by Perry & Chitton in "Size Enlargement," Chem. Eng. Handbook (5th ed.), Sec. 8, p. 57 et seq.

In making the fly ash paste, from about 1 to about 10 weight percent of water and/or binder may be used. The binder may be a natural or synthetic hydrophilic polymer or an inorganic material such as bentonite, colloidal silicone dioxide, monohydrate alumina and smectite clay minerals. The natural hydrophilic polymers include the cellulosic polymers, e.g., carboxymethylcellulose (CMC), hydroxyethylcellulose (HEC), methylcellulose (MC), gelatin, starches, etc., and the synthetic hydrophilic polymers include polyvinylalcohol, polyacrylic acid, polymethacrylic acid, polyacrylamide, hydroxyalkylmethacrylates and hydroxyalkylacrylates, polyethylene oxides, etc.

When using boiler slag for the purpose of this invention, it may be necessary to reduce the particle sizes since boiler slags are generally available as large angular, black glassy particles. In order to reduce the larger particles to the desirable range of about ⅛ to about ¾ inch, the larger boiler slag particles may be crushed or ground in accordance with generally known techniques, using conventional grinding and crushing equipment. See Perry & Chitton, supra, "Crushing and Grinding," Section 8, p. 16 et seq.

Fly ash, bottom ash and boiler slag are generally effective as cat litters in any amount, although, as a practical matter, it is recommended that the amount used to be at least about 50 weight percent based on the cat litter. The larger the particle size of fly ash, bottom ash or boiler slag, the larger the effective amount which can be efficaciously used, and vice versa.

As it was previously mentioned, fly ash, bottom ash and boiler slag may partially or totally replace Fuller's earth as cat litter. Thus, they may be used in admixture with Fuller's earth to impart deodorizing capacity thereto since, as it was previously noted, Fuller's earth lacks deodorizing capability. The relative composition of such mixtures may vary widely within the limits which are readily ascertainable by those skilled in the art. As a practical matter, however, such compositions should preferably comprise at least about 20 weight percent fly ash, bottom ash, boiler slag, or mixtures thereof in order to obtain a more effective and less expensive cat litter composition.

The following examples will serve to illustrate the effectiveness of fly ash as cat litter. These examples, however, are merely illustrative and do not limit the scope of this invention.

EXAMPLE I

Fuller's earth (produced by Hartz Mountain Corp.), a mixture of 75 weight percent Fuller's earth and 25 weight percent fly ash (produced as by-product of combustion of coal), and fly ash alone were tested as cat litters and their relative effectiveness compared in this example. In all three cases 10 cupfuls of the litter were added to an 18×24×4 inch pan containing approximately the same amount of litter (i.e., a panful), and two tests were conducted separately on two cats; one male and the other a female cat, using each of said compositions.

In the case of Fuller's earth, the litter lasted an average of 139 hours; however, when the cats used the pan after this period, the litter became lumpy and the odor emanating from the cats' excrement became excessive indicating that Fuller's earth was no longer effective.

In the case of a mixture of Fuller's earth and fly ash, the litter absorbed well and remained odor free. The litter lasted an average of 216 hours and had to be changed only because it became lumpy and the cats refused to use the pan.

When fly ash alone was used, the litter remained odor free even when the litter was changed after 228 hours since it had become lumpy and the cats once again refused to use the pan.

EXAMPLE II

The test procedure in this example was the same as in Example I except that only one male cat was tested and 7 cupful of litter were used in each test. In the case of Fuller's earth, the odor emanating from the cat excrement was excessive and the litter lasted for 10 days and 4 hours only.

When a mixture of Fuller's earth and fly ash was used, the litter lasted for 12 days and 20 hours, had no odor when wet and remained essentially odor-free. It was changed only because the litter became lumpy and the cat refused to use the pan.

In the case of fly ash alone, the litter remained essentially odor-free and was changed after 16 days and 3 hours only because it had become lumpy and the cat refused to use the pan.

The results of the tests described in the foregoing examples clearly demonstrate the remarkable superiority of fly ash as compared to Fuller's earth. Even mixtures of fly ash and Fuller's earth exhibit significantly more absorbing and deodorizing capacity than Fuller's earth alone.

Although fly ash was employed in these examples, part or all of the fly ash may be replaced by bottom ash and/or boiler slag with substantially the same efficacious results.

It is evident from the foregoing description that some changes and/or modifications may be made in this invention which are obvious from this disclosure. Such changes and modifications, however, are nevertheless within the scope and spirit of this invention.

What is claimed is:

1. A method of deodorizing cat litter which comprises adding an effective quantity of a cat litter composition to said cat litter, said cat litter composition being selected from the group consisting of fly ash, bottom ash, boiler slag and mixtures thereof.

2. A method as in claim 1 wherein said cat litter composition is fly ash produced from the combustion of coal.

3. A method as in claim 1 wherein said cat litter composition is bottom ash produced from the combustion of coal.

4. A method as in claim 1 wherein said cat litter composition is boiler slag produced from the combustion of coal.

5. A method as in claim 2 wherein said fly ash is in particulate form ranging in size from about ⅛ to about ¾ inch.

6. A method as in claim 3 wherein said bottom ash is in particulate form ranging in size from about ⅛ to about ¾ inch.

7. A method as in claim 4 wherein said boiler slag is in particulate form ranging in size from about ⅛ to about ¾ inch.

8. A cat litter composition comprising a mixture of Fuller's earth and an effective amount of at least one other cat litter selected from the group consisting of fly ash, bottom ash, boiler slag and mistures thereof.

9. A cat litter composition as in claim 8 wherein said other cat litter is fly ash.

10. A cat litter composition as in claim 8 wherein said other cat litter is bottom ash.

11. A cat litter composition as in claim 8 wherein said other cat litter is boiler slag.